(12) United States Patent
Klarer et al.

(10) Patent No.: US 7,213,238 B2
(45) Date of Patent: May 1, 2007

(54) COMPILING SOURCE CODE

(75) Inventors: Robert M. N. Klarer, Toronto (CA); Sandor C. A. Mathe, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 10/199,366

(22) Filed: Jul. 18, 2002

(65) Prior Publication Data

US 2003/0041318 A1    Feb. 27, 2003

(30) Foreign Application Priority Data

Aug. 27, 2001   (CA) .................................. 2355989

(51) Int. Cl.
*G06F 9/45* (2006.01)
(52) U.S. Cl. ..................... 717/140; 717/141
(58) Field of Classification Search ............. None
See application file for complete search history.

(56) References Cited

U.S. PATENT DOCUMENTS

| | | | |
|---|---|---|---|
| 5,280,617 A * | 1/1994 | Brender et al. ............ 717/159 |
| 5,519,868 A | 5/1996 | Allen et al. | |
| 5,632,035 A | 5/1997 | Goodwin | |
| 5,740,443 A * | 4/1998 | Carini ..................... 717/133 |
| 5,790,867 A * | 8/1998 | Schmidt et al. ............ 717/155 |
| 5,835,771 A | 11/1998 | Veldhuizen | |
| 6,041,180 A * | 3/2000 | Perks et al. ................. 717/151 |
| 6,141,792 A | 10/2000 | Acker et al. | |

* cited by examiner

*Primary Examiner*—Tuan Dam
*Assistant Examiner*—Andre R Fowlkes
(74) *Attorney, Agent, or Firm*—Mark Walker; Streets & Steele; Jeffrey L. Streets

(57) ABSTRACT

The invention provides a compiler for compiling source code files to generate corresponding object code files, the source code files including a first source code file and a second source code file, the first source code file having an initial occurrence of a unit of source code, and the second source code file having a subsequent occurrence of the unit of source code, the compiler including means for compiling the first source code file to generate the first object code file having a first unit of object code representing the initial occurrence of the unit of source code, and means for compiling the second source code file to generate the second object code file having a pointer to the first unit of object code, whereby the pointer supplants a second unit of object code representing the subsequent occurrence of the unit of source code.

30 Claims, 12 Drawing Sheets

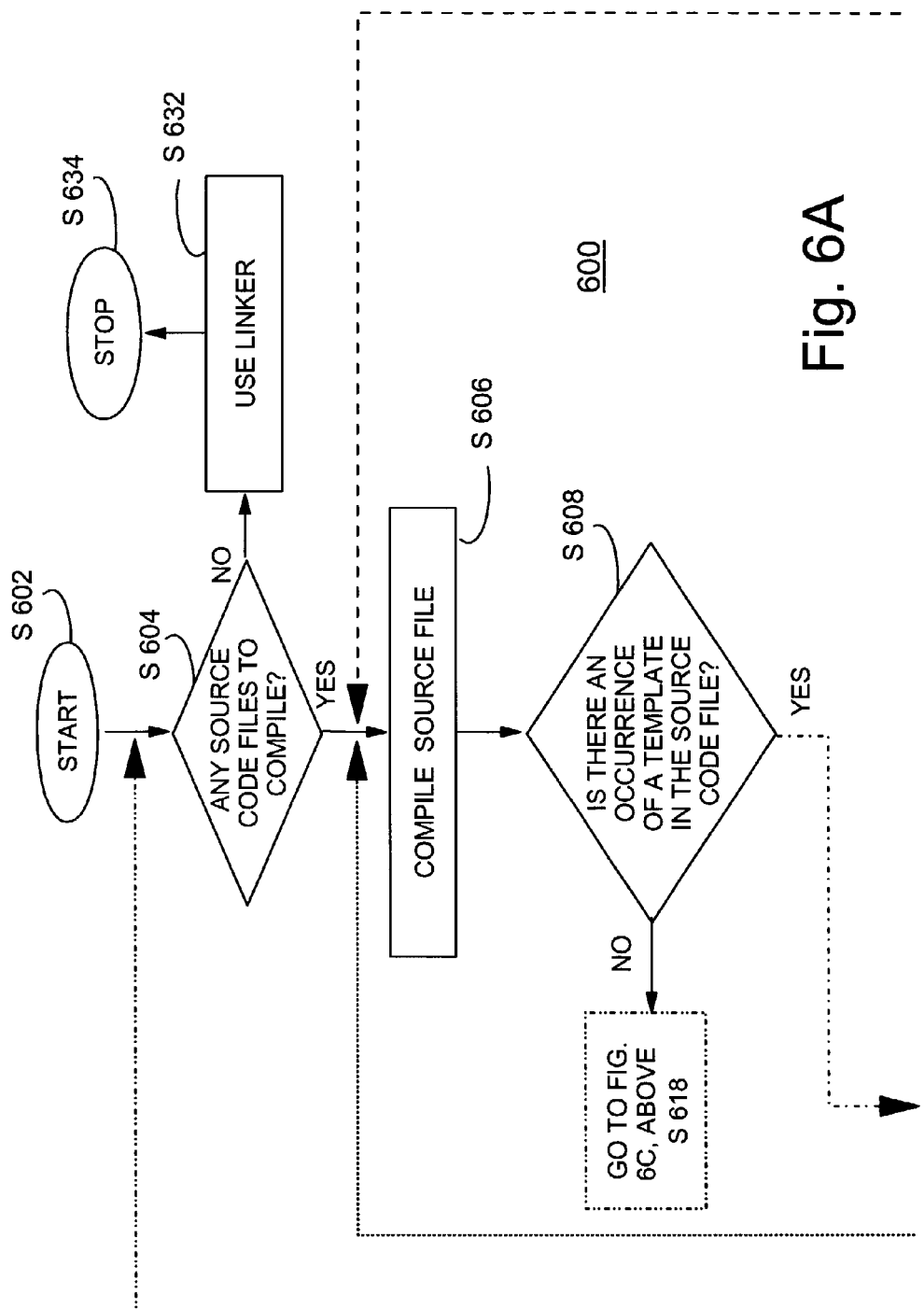

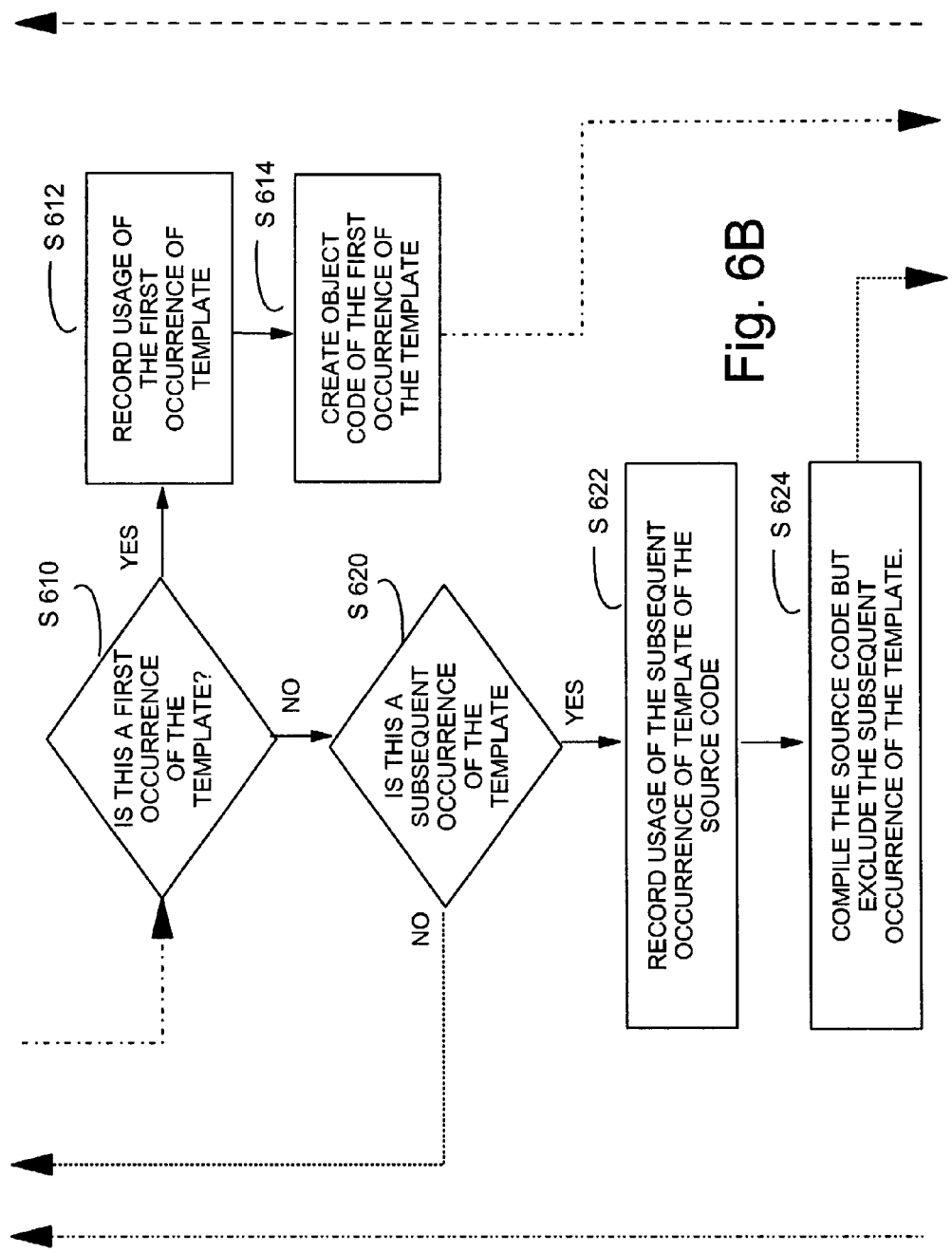

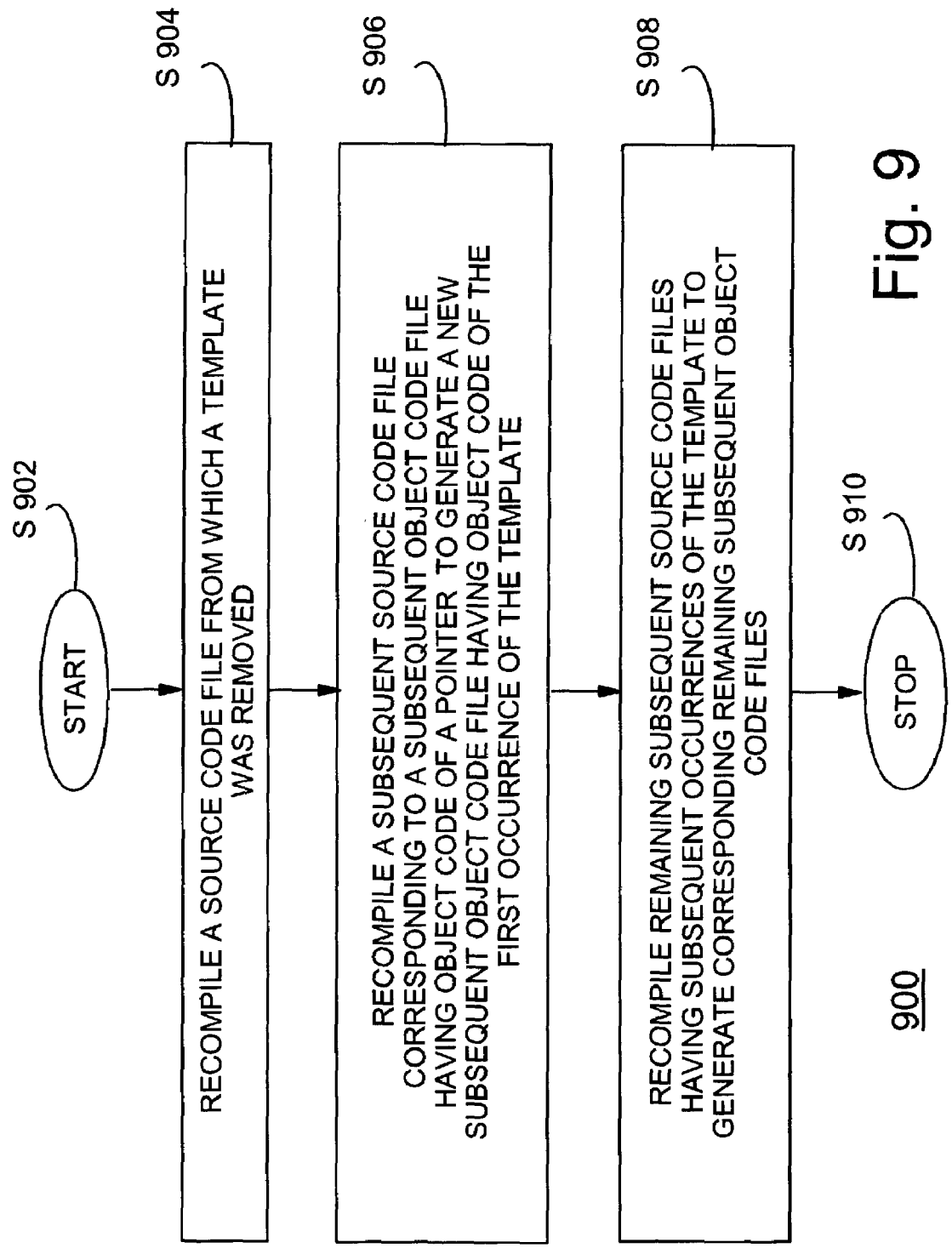

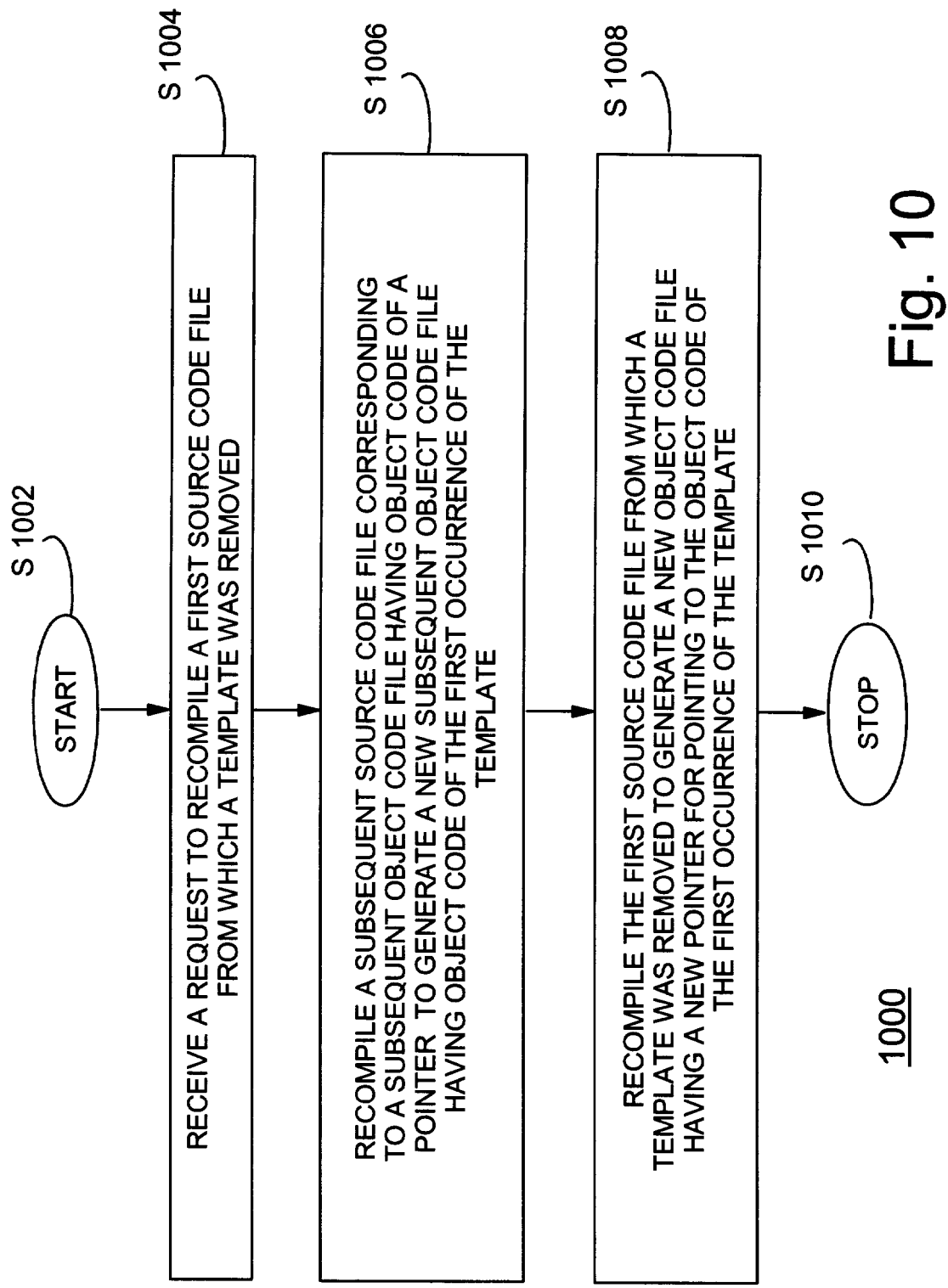

COMPILING SOURCE CODE

FIELD OF THE INVENTION

This invention relates to compiling source code files, and more specifically to compiling source code files having multiple occurrences of identical units of source code.

BACKGROUND OF THE INVENTION

A software template (which can be treated as a unit of source code), hereinafter called a 'template', is a known mechanism for reusing source code so that a software programmer can advantageously avoid rewriting or reconstructing subsequent occurrences of units of source code by using templates. Source code can include several source code files or can be a single source code file. Occurrences of a template can be found in a single source code file or in multiple source code files. A header file is usually used for defining a template. Templates are used with a computer programming language, such as C++ or ADA. However, it will be appreciated that in a generic sense a unit or source code can be repeated used in source code written in a computer programming language, such as an object oriented programming language or a structured programming language. It will be appreciated that a template can be referred by many other names, such as a "generic" in the parlance of the ADA programming language.

Referring to FIG. 1, there is depicted a compilation environment 100 for compiling a single source code file 102 having multiple occurrences of templates 104A, 104B, and 104C. A compiler 106 reads source code file 102 to generate an object code file 108 corresponding to source code file 102. Hereinafter, for the purposes of simplifying the description, the term "object code 'of' source code" will mean "object code 'corresponding to' source code". Object file 108 includes multiple occurrences of object code 110A, 110B, 110C corresponding to the multiple occurrences of templates 104A, 104B, 104C respectively. The manner in which compiler 106 operates is not adequate because compilation time was used for generating identical occurrences object code 110A, 110B, and 110C each corresponding to the same identical template, and storage space was used to store multiple occurrences of identical object code which is disadvantageously wasteful.

Generally, the prior art provides an inadequate method for compiling many source code files each having multiple occurrences of a template. Compilation time is wasted compiling the multiple occurrences of the template to generate many object code files each having multiple occurrences of identical object code of the template. In addition, the resulting generated object code files will be linked to create a bloated executable file due to the presence of the multiple occurrences of identical object code. Therefore, larger amounts of memory storage medium will be required to store the generated executable file.

Accordingly, a compiler which addresses, at least in part, these and other shortcomings is desired.

SUMMARY OF THE INVENTION

An object of the invention is to provide a mechanism for reducing compilation time when compiling source code files having multiple occurrences of templates.

The present invention provides a compilation environment for compiling source code having multiple occurrences of templates or units of identical source code. It will be appreciated that source code can include either one source code file or multiple source code files, and that multiple instances of a template can occur in either a single source code file or multiple source code files. In an embodiment, a compiler compiling source code files identifies occurrences of units of identical source code or a template. The first occurrence of the template in a source code file is noted for future reference. In a preferred embodiment, the occurrences are noted in a lookup table. An object code file is generated for a first source code file having a first occurrence of the template. However, compiling subsequent source code files to generate subsequent object code files will exclude insertion of object code for subsequent occurrences of the templates, but will instead include or insert object code of a pointer for pointing to a unit of object code corresponding to the first occurrence of the template in the first generated object code file. It will be appreciated that the compiler can be adapted to compile only a single source code file having multiple occurrences of a template.

In a first aspect of the invention, there is provided a compiler for compiling source code files to generate corresponding object code files, the source code files including a first source code file and a second source code file, the first source code file having an initial occurrence of a unit of source code, and the second source code file having a subsequent occurrence of the unit of source code, the compiler including means for compiling the first source code file to generate the first object code file having a first unit of object code representing the initial occurrence of the unit of source code, and means for compiling the second source code file to generate the second object code file having a pointer to the first unit of object code, whereby the pointer supplants a second unit of object code representing the subsequent occurrence of the unit of source code.

In a second aspect of the invention, there is provided a method for compiling source code files to generate corresponding object code files, the source code files including a first source code file and a second source code file, the first source code file having an initial occurrence of a unit of source code, and the second source code file having a subsequent occurrence of the unit of source code, the method including compiling the first source code file to generate the first object code file having a first unit of object code representing the initial occurrence of the unit of source code, and compiling the second source code file to generate the second object code file having a pointer to the first unit of object code, whereby the pointer supplants a second unit of object code representing the subsequent occurrence of the unit of source code.

In a third aspect of the invention, there is provided a computer program product for use in a computer system operatively coupled to a computer readable memory, the computer program product including a computer-readable data storage medium tangibly embodying computer readable program code for directing the computer to compile source code files to generate corresponding object code files, the source code files including a first source code file and a second source code file, the first source code file having an initial occurrence of a unit of source code, and the second source code file having a subsequent occurrence of the unit of source code, the computer program product including code for instructing the computer system to compile the first source code file to generate the first object code file having a first unit of object code representing the initial occurrence of the unit of source code, and code for instructing the computer system to compile the second source code file to generate the second object code file having a pointer to the first unit of object code, whereby the pointer supplants a second unit of object code representing the subsequent occurrence of the unit of source code.

A better understanding of these and other aspects of the invention can be obtained with reference to the following drawings and description of the preferred embodiments.

DESCRIPTION OF THE DRAWINGS

The embodiments of the present invention will be explained by way of the following drawings:

FIG. 2 depicts operations of the embodiment of FIG. 3;

FIGS. 6A, 6B, and 6C depict operations of the preferred embodiment of FIG. 5;

FIG. 7 depicts an embodiment of a table use with the embodiment of FIG. 5;

FIG. 9 depicts operations of the preferred embodiment as depicted in FIG. 8; and FIG. 10 depicts other operations of the preferred embodiment as depicted in FIG. 8.

DESCRIPTION OF THE PREFERRED EMBODIMENTS

For the purpose of simplifying the explanation of the operation of the embodiments of the invention, a software template will be described with reference to the C++ computer programming language. The invention is not limited specifically to an implementation of an embodiment of the invention in the C++ computer programming language. It will be appreciated that the embodiments of the invention are generally applicable to computer programming languages that reuse identical units of source code, or to computer languages that reuse templates or equivalents of templates, such as "generics" which are a type of template used in the ADA computer programming language.

In the C++ computer programming language, "specialization" refers to an occurrence of a template; informally, an occurrence of a template is also known as an "instance" of a template. The use of "occurrence" within the description does not infer that the scope of the invention is limited to the C++ computer programming language. The embodiments of the invention are not restricted to any particular type of template or computer programming language.

Figure 1:
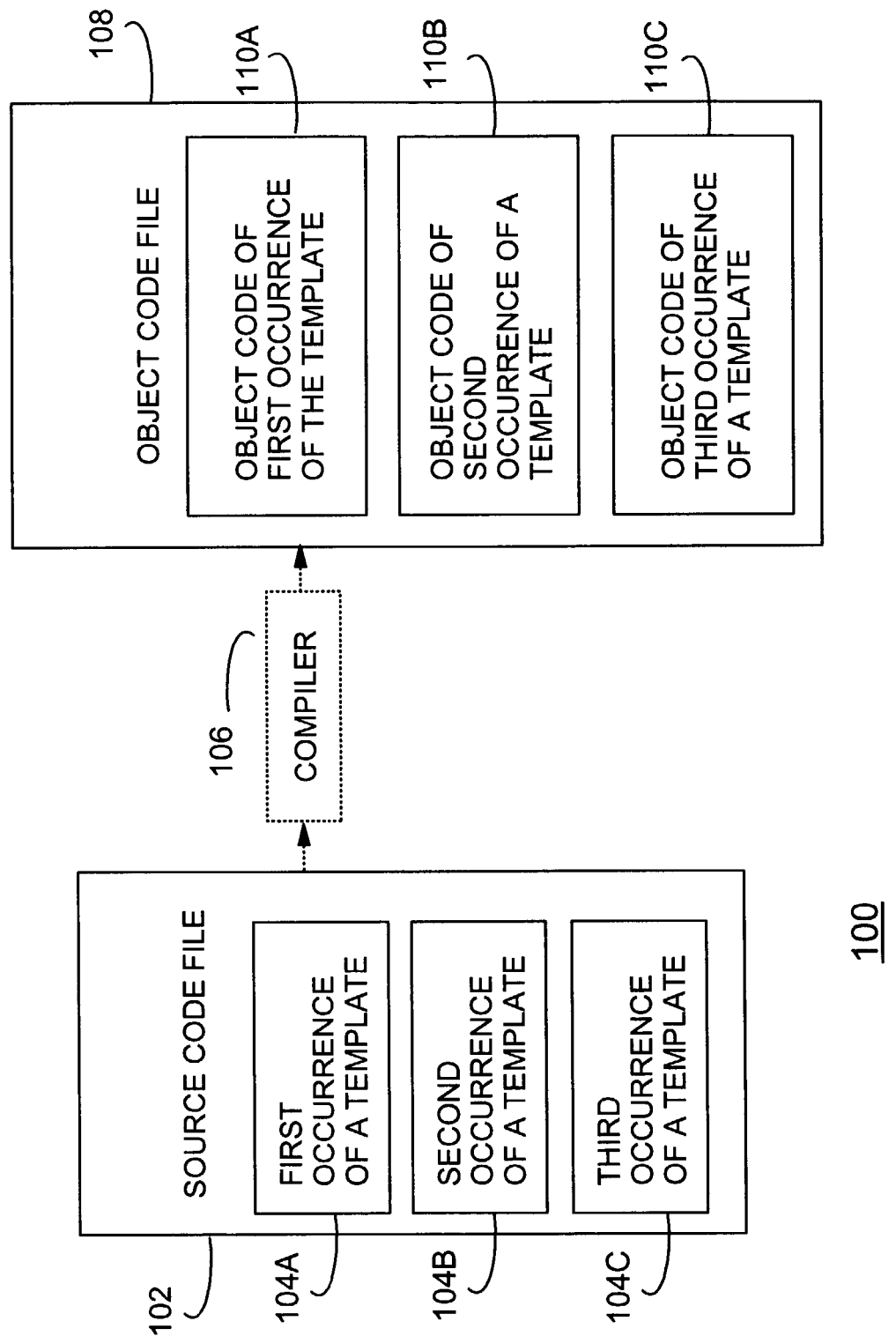
FIG. 1 depicts a compilation environment provided by the prior art.
Figure 2:
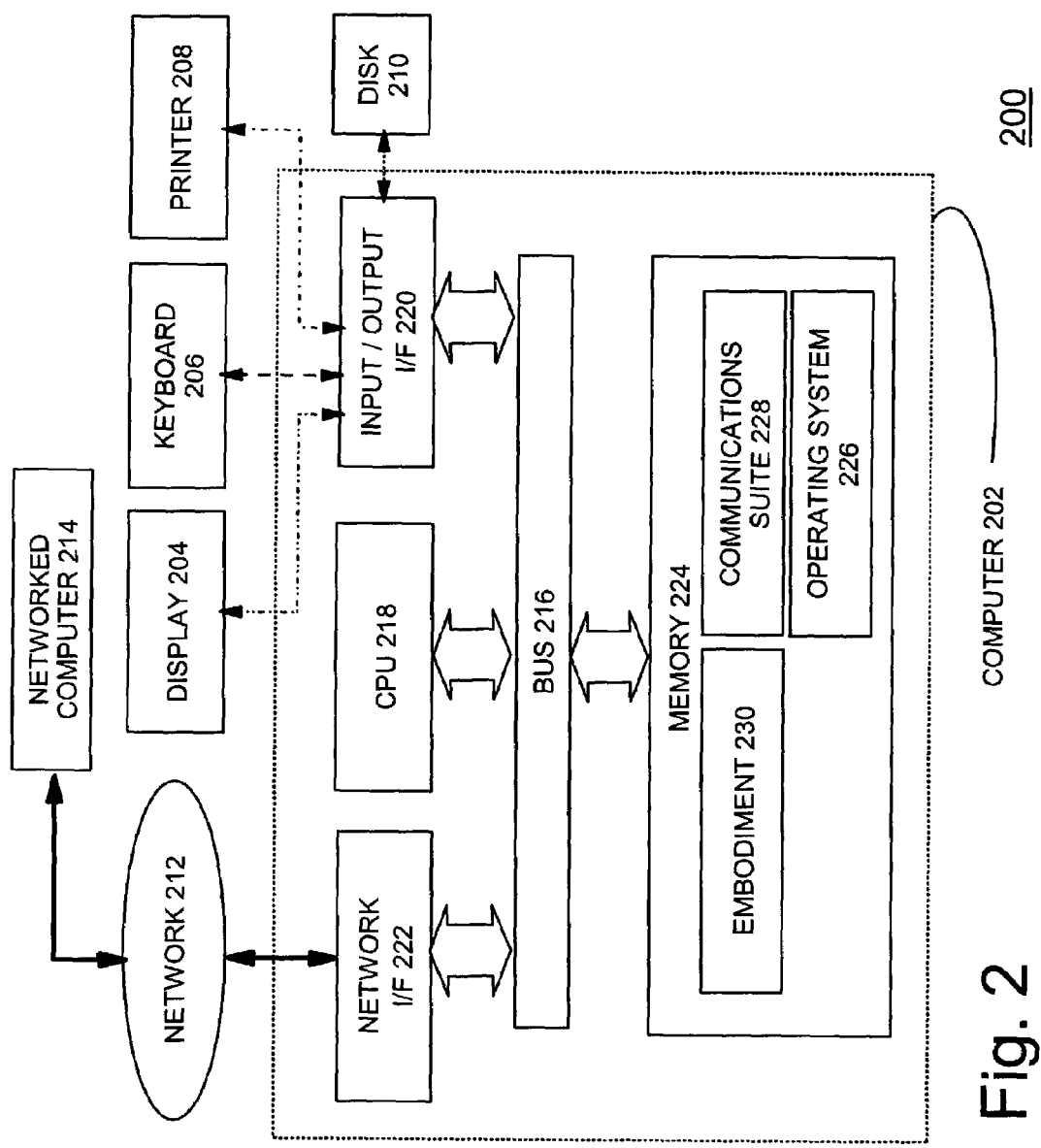
FIG. 2 depicts an embodiment of a computer system for operation with various embodiments.

Referring to FIG. 2, there is depicted a computing system 200 for operation with the embodiments of the invention. A conventional computer system 202 is operationally coupled to a networked computer 214 via suitable network connections to network 212. Network 212 is a conventional network such as a local area network, wide area network, intranets, Internet, and the like, or a convenient combination thereof. The network 212 provides a convenient mechanism for transporting data to and from the computer system 202. It will be appreciated that embodiments of the invention can operate with computer system 202 not connected to the network 212. Aspects of the embodiments of the invention can be distributed amongst various networked computers interacting with a computer system 204 via network 212 or a combination of networks. However, for convenient illustration and description of the embodiments of the invention, the embodiments will be implemented in computer system 202. Computer system 202 operates with various output devices such as a display terminal 204, a printer 208, the network 212, and with various input devices, such as keyboard/mouse 206 and a disk 210. Other devices can include various computer peripheral devices, such as a scanner, CD-ROM drives, and the like.

Computer 202 includes a bus 416 that operationally interconnects various sub-systems or components of the computer 202, such as a central processing unit (CPU) 218, a memory 224, a network interface (I/F) 222, and an input/output interface 220. CPU 218 may be a commercially available central processing unit suitable for operations described herein. Other variations of CPU 218 can include a plurality of CPUs. Suitable support circuits or components can be included for adapting the CPU 218 for optimum performance with the subsystems of computer 202. Input/output (I/O) interface 220 enables communication between various subsystems of computer 202 and various input/output devices, such as keyboard/mouse 206. Input/output interface includes a video card for operational interfacing with display unit 204, and preferably a disk drive unit for reading suitable removable computer-readable media, such as a floppy disk 210, or CD. Removable media 210 is a computer programmed product having programming instructions to be subsequently executed by CPU 218 to configure and enable system 202 to realize the embodiments of the invention. Media 210 can provide removable data storage if desired. Network interface 222, in combination with a communications suite 228, enables suitable communication between computer 202 and other computers operationally connected via network 212. Examples of a conventional network interface can include an Ethernet card, a token ring card, a modem, or the like. Optionally, network interface 222 may also enable retrieval of transmitted programmed instructions or data to subsequently configure and enable computer 202 to realize the embodiments of the embodiments of the invention. It will be appreciated that various aspects of the embodiments of the invention can be enabled in various computer systems operationally networked to form a distributed computing environment.

Memory 224 is operationally coupled via bus 216 to CPU 218. Memory 224 includes volatile and persistent memory for storage of programmed instructions of the embodiments of the invention for instructing the CPU 218. Memory 224 also includes operating system 226 and communications suite 228. Preferably, memory 224 includes a combination of random access memory (RAM), read-only memory (ROM), and a hard disk storage device. It will be appreciated that programmed instructions of the embodiments of the invention can be delivered to memory 224 from an input/output device, such as a floppy disk 210 insertable into a floppy disk drive via input/output interface 220, or downloaded to memory 224 via network 212. Operating system 226 cooperates with CPU 218 to enable various operational interfaces with various subsystems of computer 202, and providing various operational functions, such as multitasking chores and the like. Communications suite 228 provides, through interaction with operating system 226 and network interface 222, suitable communications protocols to enable appropriate communications with networked computing devices via network 212, such as TCP/IP, ethernet, token ring, and the like. Memory 224 tangibly includes an embodiment 230 of the invention as will be described below.

Embodiment 230 includes computer programmed instructions executable by CPU 218, the executable instructions for instructing CPU 218 to achieve specific tasks.

Figure 3:
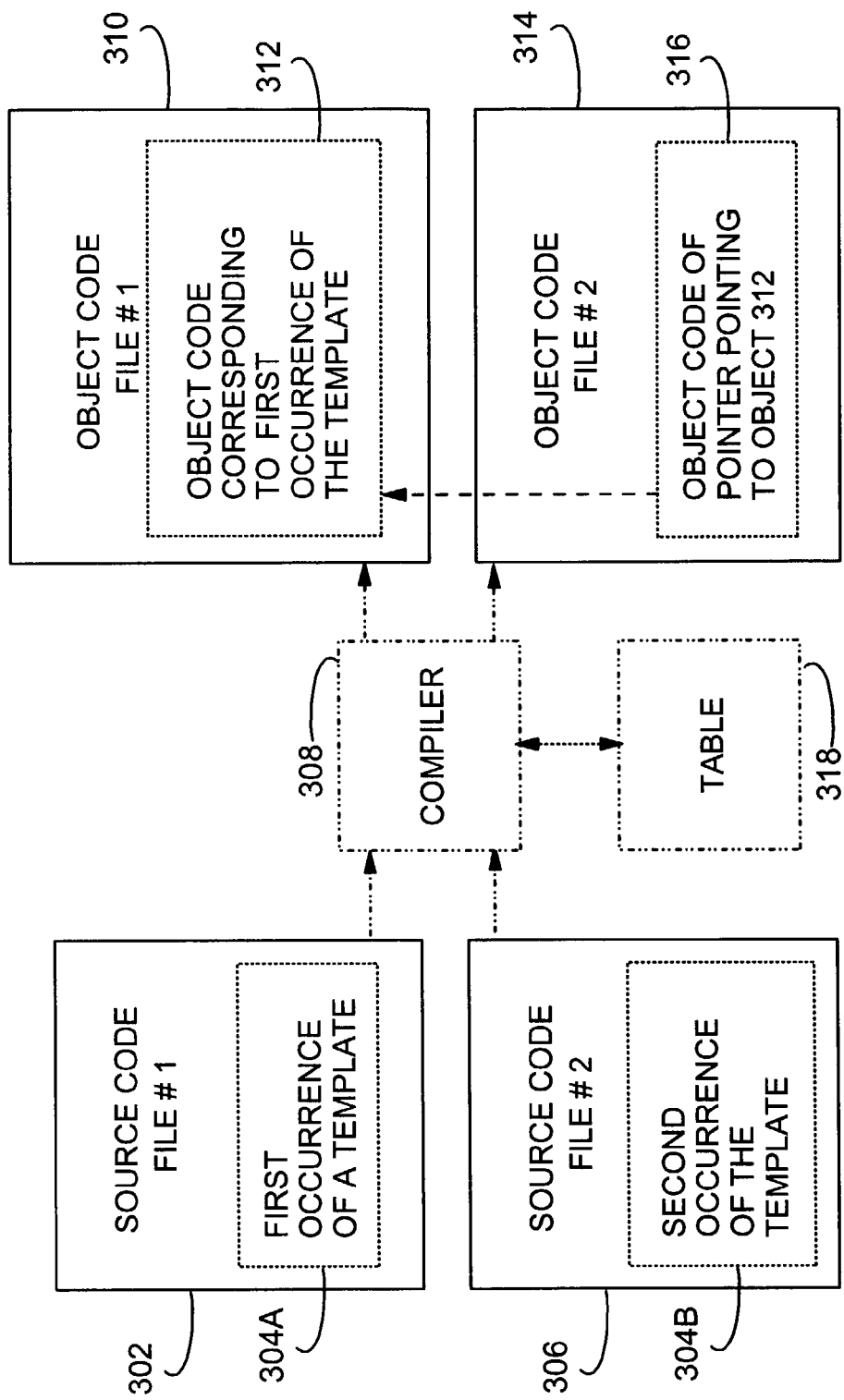
FIG. 3 depicts a compilation environment of an embodiment for use with the computer of FIG. 2.

Referring to FIG. 3, there is depicted a compilation environment 300 implemented as embodiment 230 of FIG. 2. A software programmer or a programming tool writes source code files 302, 306. Source code file 302 includes a first occurrence of a template 304A or a unit of source code. Source code file 306 includes a second or subsequent occurrence of an identical template 304B or identical unit of source code. A compiler 308 compiles source code files 302 and 306 to generate object code files 310 and 314 respectively. Object code file 310 includes object code 312 corresponding to the first occurrence of the template 304A. Object code file 314 includes object code of to pointer 316 for pointing to object code 312. Rather than compiler 308 generating and inserting object code corresponding to the second occurrence of the template 304B into file 314, the object code corresponding to the subsequent occurrence of the template 304B is supplanted by having the compiler 308 generate and insert object code 316 in place of the non-generated object code of the second occurrence of the template 304B. A linker (not shown) links object code files 310 and 314 to generate an executable file (not shown). When CPU 218 of FIG. 2 reads the object code of the pointer 316, the address of the object code 316 is placed in a stack (not shown) and the CPU executes object code 312. Once object code 312 has been executed, the CPU 218 retrieves from the stack the address of the object code 316 and begins execution at the appropriate location in the executable file. For subsequent occurrence of the template in the source code files, the compiler 308 generates and inserts object code of a pointer for pointing to object code 312 so that the object code of the first occurrence of the template can be executed. In a preferred embodiment, environment 300 includes table 318 for recording a usage of object code 312 corresponding to the first occurrence of the template 304A, for recording a usage of object code 316 corresponding to a pointer for pointing to object code 312. When compiler 308 determines a usage of a template, compiler 308 can examine table 318 to determine whether there was a prior occurrence of the template and subsequently either determine to insert object code representing a pointer into the generated object code file or determine to insert object code representing the template into the object code file.

Figure 4:
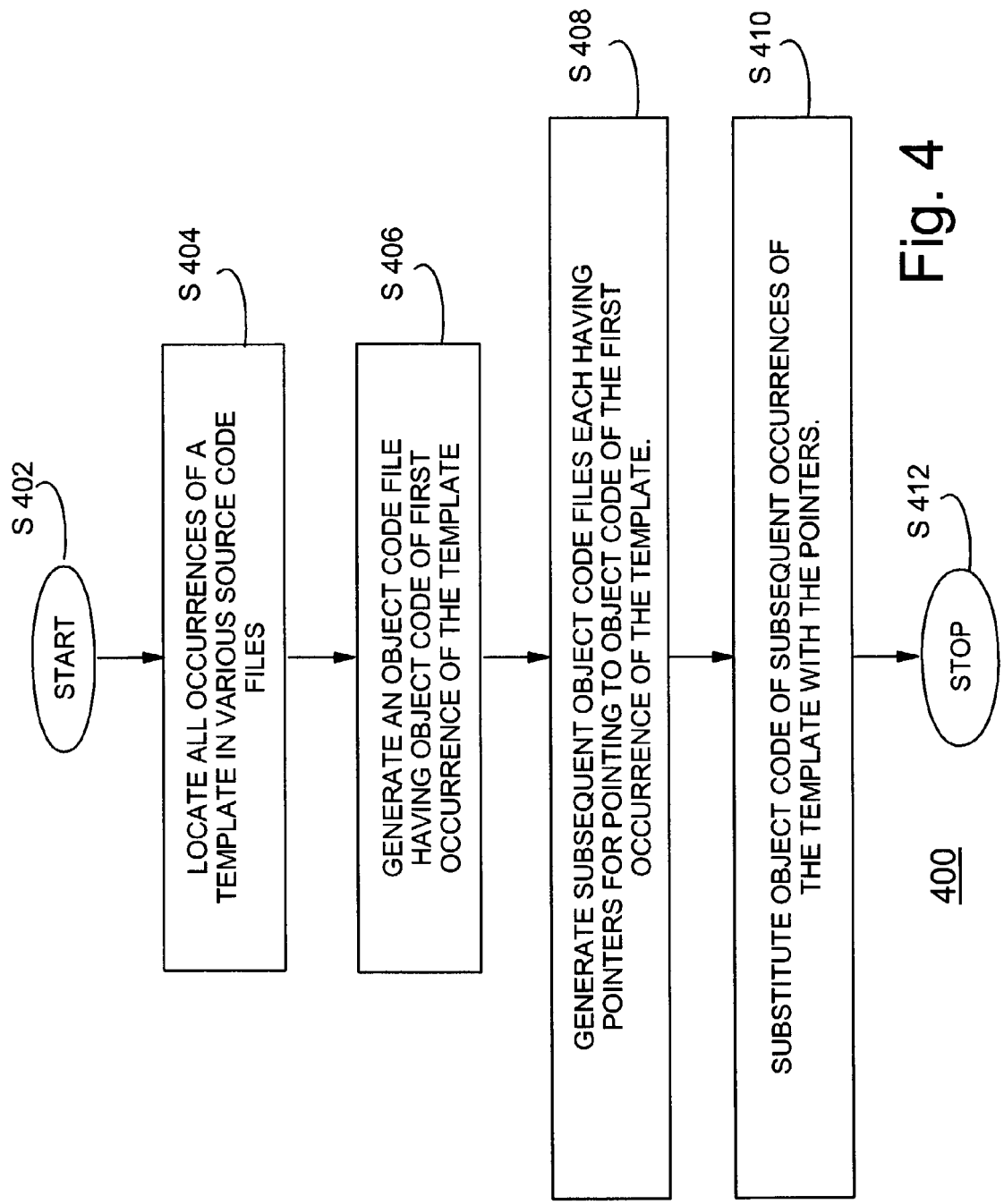

Referring to FIG. 4, there is depicted operations 400 of compiler 308 of FIG. 3. All operations depicted in FIG. 4 are performed by compiler 308 unless otherwise stated. In a preferred embodiment, computer programmed instructions tangibly embodied on a computer readable media can be used to instruct a CPU to achieve tasks embodying the operations depicted in FIG. 2. In S402, compiler 308 is ready and begins its compilation process. The algorithm follows the usual sequential compile of one file after another. In S404, compiler 308 examines a source code file, such as source code file 302 to locate an occurrence of a template, such as template 304A. In S406, when a first occurrence of a template, such as template 304A, is encountered, compiler 308 generates and inserts object code 312 corresponding to the first occurrence of a template 304A into an object code file, such as object code file 310. Compiler 308 then either examines the remainder of source code file 302 or examines another source code file 306 to locate subsequent occurrences of the template. In S408, when compiler 308 encounters a second occurrence of a template 304B, compiler 308 does not generate object code for the subsequent occurrence of the template. Rather, compiler 308 generates object code 316 for pointing to the object code 312 corresponding to first occurrence of the template 304A to supplant object code of the subsequent occurrence of the template. That is, compiler 308 generates, for each subsequent occurrence of the template in the source code files, units of object code for pointing to the object code 312. As a result, CPU 218 of FIG. 2 will execute the object code 312 each time CPU 218 executes the object code 316. In S410, compiler 308 inserts a unit of object code 316 into object file 314 corresponding to source code file 306. Since source code file 306 contains a subsequent occurrence of the template, object code file 314 of source code file 306 contains object code 316 to supplant what typically would have been object code corresponding to the subsequent occurrence of the template 304B. Object code of the subsequent occurrences of the template in various source code files are not generated and inserted into other generated object code files, but rather they are supplanted by object code of pointers which are inserted into various generated object code files. In S412, compiler 308 ends the compilation process.

Figure 5:
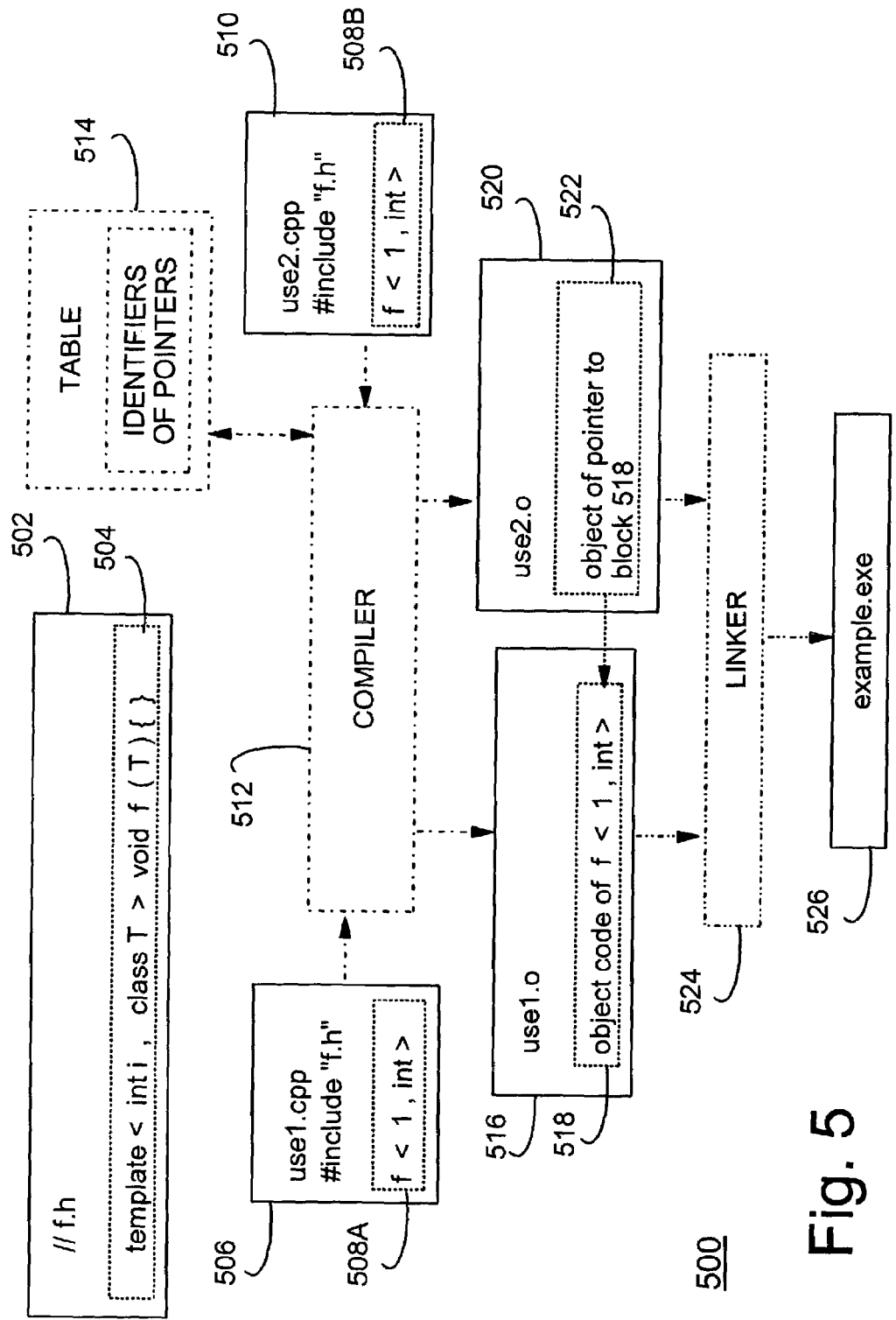

Referring to FIG. 5, there is depicted a compilation environment 500 implemented as embodiment 230 of FIG. 2. Compiler 512 includes computer programmed instructions that tangibly embody the operations depicted in FIGS. 6A, 6B, and 6C. Compiler 512 interacts with a table 514. Table 514 is used for storing and retrieving usage of object code of the first occurrence of the template in an object code file, and various uses of object code of pointers (for pointing to the object code of the first of occurrence of the template) that were inserted into various object code files of the environment 500. A preferred embodiment of table 516 is depicted as template registry 700 of FIG. 7, which is explained later.

Environment 500 includes a header file 502 defining a template 504 so that identical templates and template values can be conveniently inserted into various source code files. Source files 506 and 708 were created, for example by a computer programmer or programming tool, and are ready to be compiled by compiler 512. Source code file 506 includes a first occurrence of a template 508A. Source code file 510 includes a second or subsequent occurrence of the template 508B. Compiler 512 compiles source code files 506 and 510 to generate object files 516 and 520 respectively. Object code files 516 includes a unit of object code of the first occurrence of the template 518. Object code 522 includes a unit of object code of a pointer for pointing to the unit of object code 518. Compiler 512 generated and inserted the unit of object code of the pointer to the first occurrence of the template 522 into object code file 520 to supplant the generation and insertion of the unit of object code representing a subsequent occurrence of the template into object code file 520. Linker 524 links object code files 516 and 520 to generate an executable file 526.

Figure 6C:
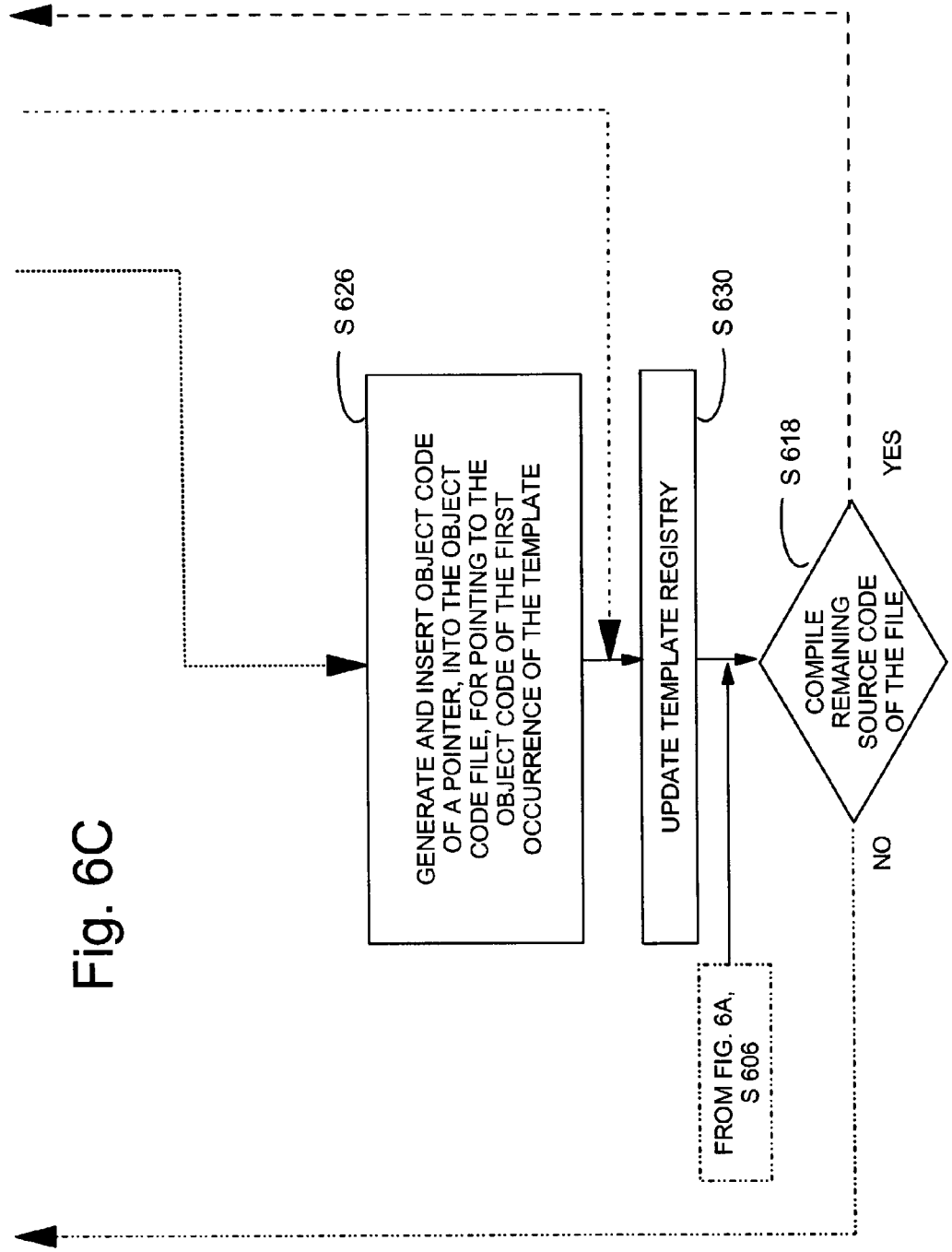

Referring to FIGS. 6A, 6B, and 6C, there is depicted operations of the compiler 512 of FIG. 5. It is understood that the operations depicted in FIGS. 6A, 6B, and 6C are, in the exemplary embodiment, performed by compiler 512 unless specifically stated otherwise. The compilation operation of compiler 512 begins at S602 of FIG. 6A. In S604, compiler 512 determines whether there are any source code files present in environment 500 that need to be compiled. Compiler 512 locates and identifies the source code files 506 and 510, and begins by selecting source code file 506. In S606, when source code file 506 has been identified, compiler 512 compiles the source code of source code file 506. During compilation of the source code file, compiler 512 determines whether there is any occurrence of a template in the selected source code file (S608). If there is no occurrence of any template in the source code file, then processing continues to S618 (of FIG. 8C) in which case a determination is made whether to continue compilation of the remaining source code of source code file 506 or begin compilation of another source code file. If compiler 512 detects an occurrence of a template, then processing continues to S610 of FIG. 8B. For example, compiler 512 detects the presence of the first occurrence of a template 508A in source code file 506 for which processing continues to S610. In S610, compiler 512 determines whether the detected occurrence of the template is a first occurrence of the template. If a first occurrence if detected, then processing continues to S612, else processing continues to S620. In operations S612 and S614 inclusive, compiler 512 manages a case where a first occurrence of the template is detected. In operations S622 to S626 inclusive, compiler 512 manages a case where subsequent occurrences of the same template are detected either in the same source code file or other source code files.

Referring to FIG. 8B, once the first occurrence of the template has been detected, such as the detection of the first template in a source code file 506, compiler 512 records a usage of the first occurrence of the template (S612). Compiler 512 records the use of the first occurrence 508A in table 514. Consequently, in S614, compiler 512 creates an object code file having a unit of object code of the detected first occurrence of the template. Compiler 512 compiles source code file 506 to generate object code file 516 having a unit of object code of the first occurrence 518. Processing continues to FIG. 8C above (i.e., immediately before) operations S630.

Referring to FIG. 8C, after recording, in table 514, the usage of the object code of the first occurrence of the template, the compiler 512 continues compiling the remaining source code of source code file 506. In S618, compiler 512 determines whether to compile any remaining source code of the source code file. For example, if source code file 506 has additional source code yet to be compiled, then processing continues to S606 in which case the remaining source code of source code file 506 is compiled. If there are subsequent occurrences of the same template in source code file 506, then the compiler 512 will generate and insert, in the object code file 506 (the currently generating object code file), a unit of object code (for each detected subsequent occurrence of the template) having a pointer for pointing to the object code of the first occurrence of the template; otherwise, processing continues to S604 because the remaining source code of source code file 506 has been completely compiled and another source code file can be selected for compilation.

Referring back to FIG. 6A, since compiler 512 has completed compilation of the source code of source code file 506 in operation S618, then processing continues to operation S604 so that subsequent occurrences of template can be detected in the other source code files. In S604, compiler 512 determines whether there are any other source code files yet to be compiled. Since source code file 510 has yet to be compiled, then processing continues to S606 so that compiler 512 can compile source code file 510. In S606, compiler 512 begins compiling another source code file, such as source code file 510. In S608, during the compilation of source code file 510, compiler 512 determines whether there is an occurrence of a template in the source code file. Since source code file 510 includes a second occurrence of the template 508B, then processing continues to S610.

In S610, compiler 512 determines whether the detected occurrence of a template is a first occurrence of the template. Since occurrence 508B is a second occurrence, then processing continues to S620. In S620, compiler 512 determines whether there is a subsequent occurrence of the template. Since occurrence 508B is the second or subsequent occurrence, then processing continues to S622. Compiler 512 queries table 514 to determine whether the occurrence of the template was previously detected in an earlier compiled source code file. Since the use of the first occurrence of the template 508A was recorded in table 514, then processing continues to S622. In S622, compiler 512 records a usage of the subsequent occurrence of the template. Compiler 512 records the usage of the second occurrence of the template 508B in table 514. It will be appreciated that source code files 506 and 510 are not modified by compiler 512. In S624, once the usage is recorded in table 514, compiler 512 compiles the source code of source code file 510 but rather than creating and including object code of the subsequent occurrence of the template, a unit of object code of a pointer is created and included in place of what traditionally would have been the object code of the subsequent occurrence of the template.

Referring to FIG. 8C, after noting the subsequent occurrence of the template 508B, in S626 compiler 512 generates and inserts object code of a pointer 522 into the created object code file 520. The object code of the pointer 522 points to the object code of the first occurrence of the template 518. Object code 522 is positioned in object code file 520 in place of the object code of the subsequent occurrence of the template that would have normally have been located in object file 520. In S630, compiler 512 updates the table 514 to indicate that the object code file 520 includes object code of the pointer. If the remaining source code of source code file 510 has been completely compiled, processing continues to S604 in which case other source code files can be selected for compilation. If all source code files have been compiled, then processing continues to S632.

Referring back to FIG. 6A, all of the source code files have been compiled and in S632 a linker links all the generated object files. Linker 524 links object files 516 and 520 to generate executable file 526. In S634, compiler 512 stops the compilation process of compiler 512. It is appreciated that a standard system linker can be used in S632.

Figure 7:
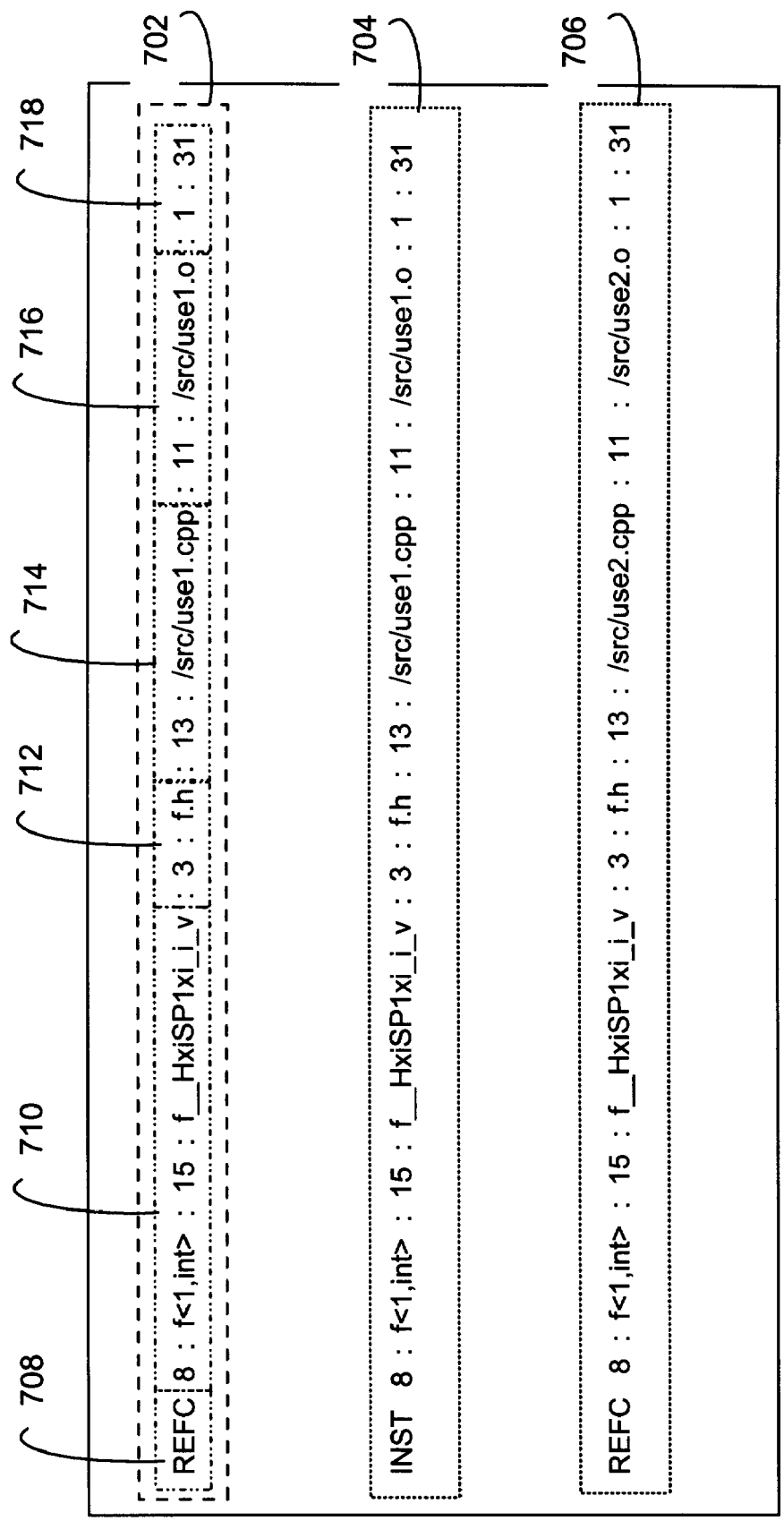
FIG. 7 depicts a compilation environment of a preferred embodiment for use with the computer of FIG. 2.

Referring to FIG. 7, there is depicted a table 700 which is an embodiment of table 514 of FIG. 5 or an embodiment of table 318 of FIG. 3. Table 700 is a database or look up table for containing records of the uses of various object code files of occurrences of a template, and uses of various subsequent object code files of pointers for pointing to object code of occurrences of templates. Table 700 includes records 702, 704 and 706. Record 702 represents usage of object code of the first occurrence of a template. Records 704 and 706 represent usage of object code of a pointer for pointing to the object code of the first occurrence of the template in place of inserting object code of the subsequent occurrences of the same template.

Record 702 includes fields 708, 710, 712, 714, 716 and 718. Each field provides a feature for assisting the operations of compiler 512 of FIG. 5. Field 708 represents a type of entry 702. The types of entries are either 'REFC' to indicate the use of object code of the first occurrence of a template in an object code file, or 'INST' to indicate the use of object code of a pointer for pointing to the object code of the first occurrence of the template in object code files. The remaining fields 710 to 718 inclusive have lengths that are convenient for computerized reading of source code files. Field 710 represents the length of the template and an identifier of the template. The form of field 710 is a matter of convenience for diagnostic and tracking purposes. Field 712 represents the length and the name of a header file that defines the template, which is used for diagnostic or for error message reporting. Field 714 represents the length and full path name of the source code file in which uses a template. Field 716 represents the length and the full path name of the object code file of the source code file. Fields 714 and 716 are used to enhance the recompilation of source code files. Field 718 represents the line number and the column number of the location of the object code of the template, which is used for diagnostic purposes or error message reporting.

Figure 8:
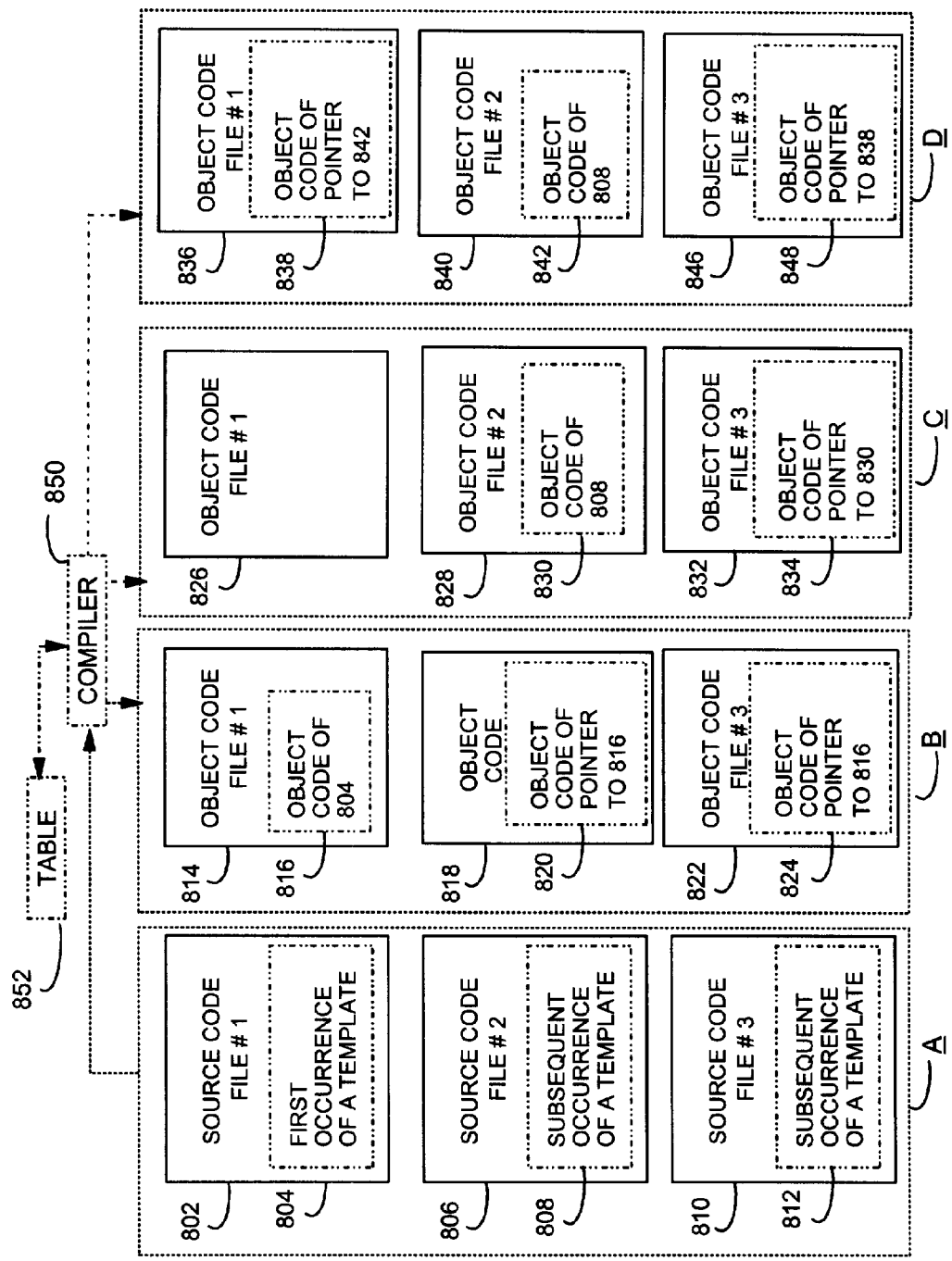
FIG. 8 depicts a compilation environment of another preferred embodiment for use with the computer of FIG. 2.

Referring to FIG. 8, there is depicted a compilation environment 800 of another preferred embodiment of the invention for updating various object code files for the case when a template is removed from a source code file which has a corresponding object code file having the object code of the first occurrence of the template.

Group 'A' represents a group of source code files ready for compilation by compiler 850. Group 'A' includes source code files 802, 806, 808 each including an occurrence of a template 804, 808, and 812 respectively. Compiler 850 performs the operations indicated in FIGS. 6A, 6B, and 6C to compile source code files 802, 806, and 808 to generate corresponding object code files 814, 818, 822 which are shown in group 'B'. Object code file 814 includes object code of the first occurrence of the template 804. Object code files 818 and 822 each include object code 820 and 822 respectively of a pointer for pointing to object code 816. When a software programmer wishes to remove the first occurrence 804 from file 802 and recompile file 802 to generate an object code file, the missing template 804 will otherwise create a problem since the object code 820 and 822 will be pointing to an entity that does not exist.

Referring to FIG. 9, there is depicted operations of compiler 850 of FIG. 8. It is understood that the steps of flowchart 900 are performed by the compiler 850 of FIG. 8 unless stated otherwise. Referring to Group 'C' of FIG. 8, there is depicted the result of using the operations of flowchart 900 for the case when a template is removed from a source code file. Compiler 850 recompiles source code file 802 from which the first occurrence 804 was removed to generate object file 826 which has no object file of the first template. Compiler 850 examines table 852 to determine the source code file which uses an occurrence of the template which was removed from file 802. Table 852 indicates that source code file 806 uses an occurrence of the template 808. Compiler recompiles source code file 806 to generate a new corresponding object file 828 having object code of the first occurrence of the template 808 (recall that template 804 was removed from source code 802). Optionally, subsequent object files, such as file 832, can be modified so that their pointers, such as pointer 834, will point to the newly created object code of the first occurrence of the template 808. Preferably, the format of the pointers is by name not location and since the name or identifier of the template does not change, then no change is needed to any other object file so that file 822 is not touched and file 832 is identical to file 822. The table 852 is updated by compiler 850 to reflect the state of the object code files as depicted in Group 'C'.

In S902, compiler 850 begins operations of flowchart 900. A user has modified a source code file 802 by removing a template 804 from the source code file 802 (the modified source code file is not depicted). The user then proceeds to request compiler 850 to recompile the modified source code file to generate a new object code file 826 that will supersede the old object code file 814 having object code of a first occurrence of a template 816. File 826 will not have object code of the first occurrence of the template. The compiler 850 examines table 852 and determines that object code 816 will be removed once the modified file 802 is recompiled and that there are subsequent object code of pointer that will be erroneously pointing to non-existing object code 816 once file 814 is regenerated. In S904, compiler 850 recompiles a source code file 802 from which a template 804 was removed to generate a new object code file 826 having no object code of the removed template. It will be appreciated that subsequent object code files 818, 822 each having at least one pointer 820, 824 for pointing to the object code 816 of the first occurrence of the template in the older object code file 814 are not useful since they point to object code 816 that no longer exists in the newly generated object code file of the modified source code file. The object code 820, 824 of the pointers need to be updated in the subsequently generated object code files. Upon generating the new object code file having no object code of the removed template (not depicted), in S906 compiler 850 recompiles a subsequent source code file 806 corresponding to a subsequent object code file 818 having object code of a pointer 820 (that pointed to the object code of the first occurrence of the template that was located but removed from the old source code file) to generate a new subsequent object code file 828 having new object code 830 of the first occurrence of the template (which is located in the subsequent source code file). Preferably, the format of the pointers is by name not location and since the name or identifier of the template does not change, then no change is needed to any other object file, and file 822 is not touched and file 832 is identical to file 822.

Optionally, upon generating the new object code file 828 having the object code 808 of the first occurrence of the template, in S908 compiler 850 recompiles remaining subsequent source code files, such as file 810, each having subsequent occurrences, such as 812, of the template to generate corresponding remaining subsequent object code files, such as 832 each having a pointer, such as 834, for pointing to the object code 830 of the first occurrence of the template located in the subsequent object file 828. It will be appreciated that the newly generated object code of the pointers are correctly pointing to the object code of the first occurrence of the template. S910 ends operations of flowchart 900.

Referring to FIG. 10, there is depicted other operations of another preferred embodiment as depicted in FIG. 8. It is understood that the steps of flowchart 1000 are performed by the compiler 850 of FIG. 8 unless stated otherwise. The operations depicted in FIG. 10 are an alternative to the operations depicted in FIG. 9. Referring to Group 'D' of FIG. 8, there depicted the result of using the operations of flowchart 1000 for the case when a template is removed from a source code file. Compiler 850 examines table 852 to determine the source code file which uses an occurrence of the template which was removed from file 802. Table 852 indicates that source code file 806 uses an occurrence of the template 808. Compiler recompiles source code file 806 to generate a new corresponding object file 828 having object code of the first occurrence of the template 808 (recall that template 804 was removed from source code 802). A new pointer 838 is located in object file 836 to replace the removed object file of the first occurrence 804, and the object code of pointers, such as object code 848 of the subsequent object files, such as file 846, are not changed because the pointers continue to point to object code 838. The table 852 is updated by compiler 850 to reflect the state of the object code files as depicted in Group 'C'.

In S1002, compiler 850 begins operations of flowchart 900. A user modifies a first source code file 802 by removing a template 804 from the first source code file, and then requests the compiler 850 to compile the modified source code file. Upon examining table 852, the compiler determines that object code 814 includes object code 816 which will be removed when file 802 is regenerated. In S1004, compiler 850 receives a request to recompile a first source code file 802 from which a template was removed 804 (the modified source code file is not depicted). Upon receiving the request, in S1006 compiler 850 recompiles a subsequent source code file 806 corresponding to a subsequent object code file 818 having object code 820 of a pointer (that points to object code 816 of a first occurrence of the template located in the first object code file 814 corresponding to the first source code file 802) to generate a new subsequent object code file 840 having object code 842 of the first occurrence of the template 808. Upon generating the subsequent object code file 840, in S1008 compiler 850 recompiles the modified first source code file (not depicted) from which the template 804 was removed to generate a new object code file 836 having new object code 838 of a pointer for pointing to the object code 842 of the first occurrence of the template 808. It will be appreciated that the remaining source code files, such as file 810, do not have to be regenerated because they have corresponding object code files, such as code 846, each having object code of pointers, such as code 848, for pointing to object code 838 in the first object code file 836. In S1010, compiler 850 ends operations of flowchart 1000.

It will be appreciated that variations of some elements are possible to adapt the invention for specific conditions or functions. The concepts of the present invention can be further extended to a variety of other applications that are clearly within the scope of this invention. Having thus described the present invention with respect to a preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The embodiments of the invention in which an exclusive property or privilege is claimed are defined as follows:

1. A compiler for compiling source code files to generate corresponding object code files, the source code files including a first source code file and a second source code file, the first source code file having an initial occurrence of a unit of source code, and the second source code file having a subsequent occurrence of said unit of source code, the compiler comprising:
   one or more processors for compiling said first source code file to generate said first object code file having a first unit of object code representing said initial occurrence of said unit of source code; and
   one or more processors for compiling said second source code file to generate said second object code file having a pointer to said first unit of object code;
   whereby the pointer supplants a second unit of object code representing said subsequent occurrence of the unit of source code.

2. The compiler of claim 1, further comprising:
   means for recording a usage of the unit of object code representing the initial occurrence of a unit of source code; and
   means for recording the usage of said pointer.

3. The compiler of claim 2, wherein the usage of the unit of object code and the usage of the pointer is recorded in a table.

4. The compiler of claim 3, further comprising:
   means for examining the table to determine the usage of the unit of object code and the usage of the pointer.

5. The compiler of claim 3, further comprising:
   means for locating the initial occurrence of the unit of source code and
   means for locating subsequent occurrences of the unit of source code.

6. The compiler of claim 5, further comprising:
   means for updating the pointer when the initial occurrence of the unit of source code is removed from the first source code file and occurs in another source code file.

7. The compiler of claim 6, further comprising:
   means for linking the first and the second object code files to generate a linked object code file.

8. The compiler of claim 1, wherein occurrences of the units of source code are templates.

9. The compiler of any of claim 1, wherein the source code is written in a computer programming language which is an object oriented computer programming language.

10. The compiler of claim 9, wherein the object oriented computer programming language is C++.

11. A method for compiling source code files to generate corresponding object code files, the source code files including a first source code file and a second source code file, the first source code file having an initial occurrence of a unit of source code, and the second source code file having a subsequent-occurrence of the unit of source code, the method comprising:
   compiling the first source code file to generate the first object code file having a first unit of object code representing the initial occurrence of the unit of source code; and
   compiling the second source code file to generate the second object code file having a pointer to first unit of object code;
   whereby the pointer supplants a second unit of object code representing the subsequent occurrence of the unit of source code.

12. The method of claim 11, further comprising:
   recording a usage of the unit of object code representing the initial occurrence of the code; and
   recording a usage of the pointer.

13. The method of claim 12, wherein the usage of the unit of object code and the usage of the pointer is recorded in a table.

14. The method of claim 13, further comprising examining the table to determine the usage of the unit of object code and the usage of the pointer.

15. The method of claim 13, further comprising:
   locating the initial occurrence of the unit of source code; and
   locating subsequent occurrences of the unit of source code.

16. The method of claim 15, further comprising updating the pointer when the initial occurrence of the unit of source code is removed from the first source code file and occurs in another source code file.

17. The method of claim 16, further comprising linking the first and the second object code files to generate a linked object code file.

18. The method of any of claim 11, wherein occurrences of the units of source code are templates.

19. The method of claim 11, wherein the source code is written in a computer programming language which is an object oriented computer programming language.

20. The method of claim 19, wherein the object oriented computer programming language is C++.

21. A computer program product for use in a computer system operatively coupled to a computer readable memory, the computer program product including a computer-readable data storage medium tangibly embodying computer readable program code for directing the computer to compile source code files to generate corresponding object code files, the source code files including a first source code file and a second source code file, the first source code file having an initial occurrence of a unit of source code, and the second source code file having a subsequent occurrence of the unit of source code, the computer program product comprising:

means for compiling the first source code file to generate the first object code file having a first unit of object code representing said initial occurrence of said unit of source code; and means for compiling the second source code file to generate the second object code file having a pointer to the first unit of object code;

whereby the pointer supplants a second unit of object code representing the subsequent occurrence of the unit of source code.

22. The computer program product of claim 21, further comprising:

means for recording a usage of the unit of object code representing the initial occurrence of a unit of source code; and means for recording a usage of the pointer.

23. The computer program product of claim 22, wherein the usage of the unit of object code and the usage of the pointer is recorded in a table.

24. The computer program product of claim 23, further comprising means for examining the table to determine the usage of the unit of object code and the usage of the pointer.

25. The computer program product of claim 23, further comprising:

means for locating the initial occurrence of the unit of source code; and means for locating subsequent occurrences of the unit of source code.

26. The computer program product of claim 25, further comprising means for updating the pointer when the initial occurrence of the unit of source code is removed from the first source code file and occurs in another source code file.

27. The computer program product of claim 26, further comprising means for linking the first and the second object code files to generate a linked object code file.

28. The computer program product of claim 21, wherein occurrences of the units of source code are templates.

29. The computer program product of claim 21, wherein the source code is written in a computer programming language which is an object oriented computer programming language.

30. The computer program product of claim 29, wherein the object oriented computer programming language is C++.

* * * * *